United States Patent [19]
Chenot et al.
[11] 4,068,128
[45] Jan. 10, 1978

[54] $(HF_{1-x}ZR_x)_3P_2O_{11}$ LUMINESCENT MATERIAL, METHOD OF PREPARATION AND X-RAY INTENSIFYING SCREEN CONTAINING SAME

[75] Inventors: Charles Frederic Chenot, Towanda; James Evan Mathers, Ulster; Francis Nathan Shaffer, Towanda, all of Pa.

[73] Assignee: GTE Sylvania Incorporated, Stamford, Conn.

[21] Appl. No.: 755,742

[22] Filed: Dec. 30, 1976

[51] Int. Cl.[2] .............................................. C09K 11/42

[52] U.S. Cl. ............................. 250/483; 252/301.4 P; 252/301.4 F; 423/305; 423/306; 428/328; 428/539; 428/913

[58] Field of Search ............... 423/305, 306, 311, 314; 252/301.4 P, 301.4 F; 250/483; 428/539, 328, 913

[56] References Cited

U.S. PATENT DOCUMENTS

| | | | |
|---|---|---|---|
| 2,770,749 | 11/1956 | Bril et al. | 252/301.4 P X |
| 3,905,912 | 9/1975 | Mathers | 252/301.4 P |
| 3,941,715 | 3/1976 | Shidlovsky | 252/301.4 P |
| 4,014,813 | 3/1977 | Shidlovsky | 423/305 X |

*Primary Examiner*—Jack Cooper
*Attorney, Agent, or Firm*—John C. Fox

[57] ABSTRACT

An oxide composition of 3:1 $(Hf_{1-x}Zr_x)O_2:P_2O_5$, and having the empirical formula $(Hf_{1-x}Zr_x)_3P_2O_{11}$, where $x$ is in the range of about 0 to 0.5, is an effective luminescent material for use in x-ray intensifying screens, and also an effective luminescent material host for $Eu^{+2}$ blue emmissions. The luminescent material is obtained in essentially single crystalline large particles when prepared in the presence of a magnesium fluoride flux.

13 Claims, 3 Drawing Figures

$(HF_{1-x}ZR_x)_3P_2O_{11}$ LUMINESCENT MATERIAL, METHOD OF PREPARATION AND X-RAY INTENSIFYING SCREEN CONTAINING SAME

CROSS REFERENCE TO RELATED APPLICATION

Co-pending U.S. patent applications Ser. No. 739,577 and Ser. No. 739,691 filed concurrently herewith, and assigned to the present assignee, are directed to other hafnium, zirconium phosphate compounds also having utility as luminescent materials, e.g., in x-ray intensifying screens.

Ser. No. 739,691 relates to large single crystalline essentially cubic particles of $(Hf_{1-x}Zr_x)$ $P_2O_7$ having strong, about 60 nm bandwidth, emission peaking at about 340 nm (on an uncorrected basis) with controlled persistence under x-ray excitation.

Ser. No. 739,577 includes large single crystalline essentially hexagonal particles of $(Hf_{1-x}Zr_x)_{3-y}A_{4-y}$ $(PO_4)_4$ having strong, about 60 nm bandwidth, emission peaking at about 350 nm (on an uncorrected basis) with controlled persistence under x-ray excitation. The hexagonal structure has also been found to be an effective host for $Eu^{+2}$ green emission under uv, etc. excitation.

BACKGROUND OF THE INVENTION

This invention relates to a new compound having utility as a luminescent material and more particularly relates to a new hafnium, zirconium phosphate luminescent material excitable by x-ray, ultraviolet, etc. radiation and also relates to a method for producing large single crystalline particles of such material, and to x-ray intensifying screens incorporating such material.

Self-activated hafnium pyrophosphate, zirconium pyrophosphate, and mixed hafnium, zirconium pyrophosphate luminescent materials, which emit in the lower ultraviolet region of the electromagnetic spectrum, are known. For example, U.S. Pat. No. 2,770,749 issued to A. Bril et al discloses a zirconium pyrophosphate phosphor. I. Shidlovsky et al in "Luminescence of Self-Activated Hafnium Pyrophosphate", Abstract #95 of the May, 1974 meeting of the Electrochemical Society, disclose that hafnium pyrophosphate emits in the ultraviolet region more efficiently than zirconium pyrophosphate when excited by photoluminescence and cathodoluminescence. In U.S. Pat. No. 3,941,715, Shidlovsky discloses mixed $(Hf,Zr)P_2O_7$ phosphors which emit in the lower ultraviolet region (below about 3,000 Angstroms) when excited by x-rays, cathode rays or visible radiation.

Hafnium phosphate luminescent materials having the formula $Hf_3(PO_4)_4$ and containing activator elements such as Cu and Eu are disclosed in U.S. Pat. Nos. 3,905,911 and 3,905,912 to J. E. Mathers, and assigned to the present assignee. However, upon excitation by x-rays these materials emit in the visible portion of the spectrum, and are therefore of no utility for x-ray intensifying screen applications requiring ultraviolet emissions.

SUMMARY OF THE INVENTION

In accordance with the invention, a new 3:1 $(Hf_{1-x}Zr_x)O_2$:$P_2O_5$ compound has been discovered having the empirical formula $(Hf_{1-x}Zr_x)_3P_2O_{11}$, which is an effective luminescent material for use in x-ray intensifying screens and other intensifying devices, where x is within the range of 0 to about 0.5, and is an effective luminescent material host for $Eu^{+2}$ blue emission under ultraviolet etc. excitation.

The material exhibits strong ultraviolet emissions at a bandwidth of about 70 nm peaking at about 350 nm (on an uncorrected basis). Further, in accordance with the invention, when the 3:1 mixture of components is fluxed with from about 10 to 100 mole percent of $MgF_2$, the temperature required to develop large single crystalline particles of mainly the new 3:1 structure is lowered. This fluxed material exhibits stronger uv emission intensity than the non-fluxed materials. When used in x-ray intensifying screens with conventional silver halide emulsion x-ray film, such luminescent materials result in good image resolution upon the x-ray film without substantial crossover.

A problem associated with x-ray intensifying screens when used with conventional double emulsion x-ray film packs is so-called "cross-over". Cross-over is a loss of resolution on the exposed film attributed to the phenomenon of a photon in the visible spectrum passing through the emulsion on one side of the film pack, through the film base, and exposing the emulsion on the far side. Since the photons are transmitted in all directions from the phosphor on the intensifying screen, the image can become less sharp as a result of the far side exposure. Attempts have been made in the past to incorporate dyes into the film base which would render the base opaque to visible light, thereby eliminating crossover. Such attempts have not been completely satisfactory.

Currently, x-ray film packs use plastic supports such as polycarbonates, polystyrenes, polyesters and the like as film bases, which while being opaque to ultraviolet light, are transparent to visible radiation. Since the film emulsions are sensitive to ultraviolet light, finding an x-ray phosphor having sufficient brightness (speed) and only emitting in the ultraviolet region would result in a sharp film image by the substantial elimination of crossover.

Accordingly, in addition to the new 3:1 compound, the invention includes large particle single crystalline luminescent material of $(Hf_{1-x}Zr_x)_3P_2O_{11}$, wherein x is within the range of about 0 to 0.05, and includes a method for producing such large particle luminescent materials, and also includes x-ray intensifying screens incorporating such materials having values of x within the range of about 0 to 0.5.

DETAILED DESCRIPTION OF THE INVENTION

Figure 1:
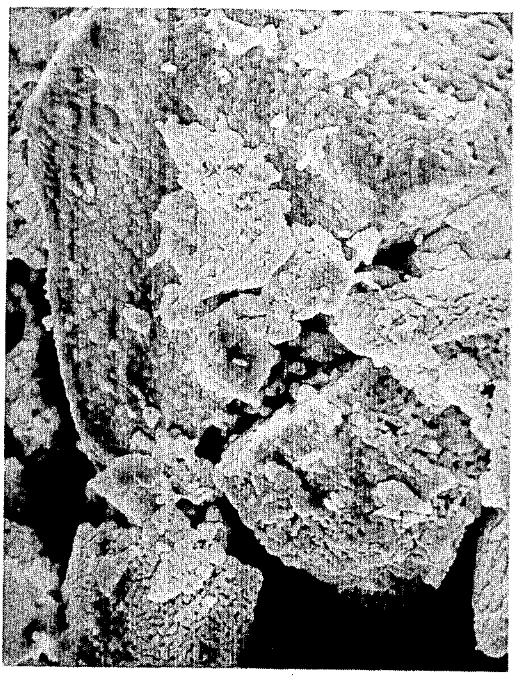
FIG. 1 is a photomicrograph of porous aggregates of $(Hf_{1-x}Zr_x)_3P_2O_{11}$ prepared from a formulated oxide composition of 75 mole percent $(Hf_{1-x}Zr_x)O_2$, and 25 mole percent $P_2O_5$.

For a better understanding of the present invention, together with other and further objects, advantages and capabilities thereof, reference is made to the following disclosure and appended claims in connection with the above-described drawings.

While x values determining the molar ratios of hafnium and zirconium may range from 0 to 0.05 and thus encompass the hafnium end member for x-ray intensifying screen use, it is preferred to maintain the values of x between about 0 and 0.25. It has been found that as the ratio of zirconium to hafnium increases, relative x-ray persistence desirably decreases.

Starting materials as the oxides or as precursors thereof may be employed. As used herein, the term "precursor" means any compound which upon heating to the reaction temperature or below, decomposes, hydrolyzes or otherwise converts to the desired oxide, such as carbonates, nitrates, sulphates, formates, oxylates, halides, etc. Preferred starting materials are hafnium oxychloride, zirconyl nitrate, and dibasic ammonium hydrogen phosphate.

A general procedure for preparation of the luminescent materials will now be described. The formulated mixture of starting materials having a molar proportion of $(Hf_{1-x}Zr_x)O_2:P_2O_5$ within the range of about 2.85 to 3.15 is reacted at a firing temperature within the range of about 1400° to 2000° C for about 1 to 8 hours, to form a porous aggregate of the compound. Large single crystalline particles may be formed by doping the starting mixture with about 10 to 100 mole percent of $MgF_2$ and then heating at about 1200° to 1600° C for about 1 to 8 hours. Preferably, the mixture is heated at least once prior to firing to a temperature within the range of about 260° to 500° C for about 1 to 16 hours, in order to insure the removal of at least a portion of contained volatile material, and in some cases to partially decompose and/or pre-react precursor materials. This prefiring heat treatment is then followed by mechanically reducing the mixture to a relatively uniform powder mixture, such as by pulverizing and blending or by mortaring with a mortar and pestle.

The invention is not limited to the procedure cited above. For example, optimum final firing temperature is contingent upon such factors as hafnium to zirconium ratio, particular flux chosen, etc. Hafnium and zirconium phosphate salts could be precipitated from solution and fired with or without an appropriate flux such as for example, $MgF_x$, or the desired $(Hf_{1-x}Zr_x)_3P_2O_{11}$ matrix material could be formed and then refired with or without an appropriate flux such as for example $MgF_2$ to form single crystalline material without departing from the spirit or scope of the invention.

EXAMPLE I

To better understand the invention, the detailed procedure employed for the synthesis of sample 3 of Table III is set forth.

Table I sets forth the starting materials, their molar ratios, their formula weights, their gram ratios based upon 1 mole, and the batch ratio in grams based upon a 2 mole batch.

TABLE I

| | Mol Ratio | Formula Weight | Gram Ratio (1 Mol) | Batch Ratio (0.2 Mol) (Grams) |
|---|---|---|---|---|
| $HfOCl_2 \cdot 8H_2O$* [Assay 47.8%(Hf,Zr)$O_2$] | 3.00 | 440.34 | 1321.02 | 264 |
| $NH_4H_2PO_4$ [Assay 98%] | 2.08 | 117.38 | 244.15 | 49 |

*containing 3.1 weight percent elemental Zr per unit weight of Hf plus Zr in the raw material.

These starting materials were weighed in accordance with the batch ratio weights shown in the last column of Table I, and blended in a polyethylene bag by intermittently rolling the bag with a rolling pin and shaking the bag. The thus roughly blended material was then divided between two 500 ml volume alumina crucibles, covered, placed in a furnace at 260° C for 2 hours, removed from the furnace and allowed to cool to room temperature. The material was then mortared with a porcelain mortar and pestle, recombined into a single batch and charged into a single 500 ml alumina crucible, the crucible covered and placed in an electrical furnace at 500° C, with the furnace door slightly ajar to allow escape of vapors. The temperature was then increased to about 1300° C over a period of about 4 hours and held at this temperature for about 4 additional hours, with the door shut. The crucible was then removed from the furnace and allowed to cool to room temperature.

The fused mass was reduced to a white body-colored powder with a mortar and pestle, and passed through a 60-mesh sieve.

The material was then redivided between two 100 ml alumina crucibles, covered, placed in a furnace at 1200° C, heated to 1580° C in ½ hour, and held at this temperature for about 7 hours, after which the temperature was dropped to 1100° C in ½ hour. The crucibles were then removed from the furnace and allowed to cool to room temperature. The material was then mortared and passed through a 100 mesh sieve. The sieved white body-colored powder had a porous aggregate character being mainly the 3:1 compound with some $HfO_2$, and strong emission, (about 70 nm in bandwidth peaking at about 350 nm on an uncorrected basis), with medium persistence, under x-ray excitation.

EXAMPLE II

The procedure of Example I was generally followed for a starting material batch, as shown in Part 1 of Table II, except as noted below, to produce sample 2 of Table III.

TABLE II

| Material | Mol Ratio | Formula Weight | Gram Ratio | Batch Ratio (0.05 Mol) (Grams) |
|---|---|---|---|---|
| | Part (1) | | | |
| $HfOCl_2 \cdot 8H_2O$* [Assay 47.8%(Hf,Zr)$O_2$] | 3.00 | 440.34 | 1321.02 | 66.02 |
| $NH_4H_2PO_4$ [Assay 98%] | 2.00 | 117.38 | 234.76 | 11.75 |
| | Part (2) | | | |
| $MgF_2$ [Assay 88.7%] | 0.30 | 70.26 | 21.08 | 1.05 |

*containing 3.1 weight percent elemental Zr per unit weight of Hf plus Zr in the raw material.

The pre-firing heat treatment was carried out at 370° C, instead of 260° C, and was repeated followed by mortaring. Prior to firing, $MgF_2$ in the amount shown in Part (2) of Table II was added to the batch. The firing procedure was altered to achieve a temperature of 1350° C after about 3 hours, and held for 5 additional hours at this temperature, after which the crucible was removed and allowed to cool to room temperature. The refiring procedure of Example I was deleted.

The sieved white body-colored, powder had a large single crystalline particulate character, being mainly the 3:1 compound, and having strong emission (about 70 nm in bandwidth, peaking at about 350 nm on an uncorrected basis) with strong persistence under x-ray excitation.

TABLE III

| Sample Number | Oxide Composition (mole percent) Formulated from Starting Materials: $Hf_{1-x}Zr_xO_2$ a (mol) | $ZrO_2$ b | $P_2O_5$ (mol) | $MgF_2$ (mol) | Mole Ratio Hf/Zr | Evaluation Data on Fired, Washed & Dried Material: Absolute Density (Where Measured) (g/cc) | Median Particle Diameter (m) | XEOL d Intensity | Persistence |
|---|---|---|---|---|---|---|---|---|---|
| 1 | 3.00 | 0.0 | 1.00 | — | 94.3/5.7 | | 13.7 | 1.22 | 1.72 |
| 2 | 3.00 | 0.0 | 1.00 | 0.30 | 94.3/5.7 | 5.99 | 15.0 | 1.44 | 2.61 |
| 3 c | 3.00 | 0.0 | 1.00 | — | 94.3/5.7 | | 19.2 | 1.10 | 1.63 |
| 4 | 2.55 | 0.45 | 1.00 | — | 85./15. | | 16.2 | 0.93 | 0.60 |

a Reactor grade $Hf_{1-x}Zr_xOCl_2 \cdot x\ H_2O$
b Zirconyl Nitrate
c X-ray Diffraction pattern for 3:1 $MO_2$:$P_2O_5$ structure with about 20% $HfO_2$. (See Table IV for X-ray Diffraction Report)
d PAR ($CaWO_4$ X-ray Phosphor); I = 1.00; P = 0.00

TABLE IV

X-RAY DIFFRACTION REPORT FOR 3:1 Hafnium Phosphate Compound (contains approximately 20% $HfO_2$)

| d | I |
|---|---|
| 5.47 A | 100 |
| 3.40 | 49 |
| 3.30 | 64 |
| 3.28 | 61 |
| 3.24 | 29 |
| 3.01 | 15 |
| 2.676 | 12 |
| 2.470 | 18 |
| 2.362 | 14 |
| 2.328 | 20 |
| 2.313 | 28 |
| 2.139 | 16 |
| 1.957 | 13 |
| 1.921 | 4 |
| 1.869 | 7 |
| 1.757 | 10 |
| 1.702 | 4 |
| 1.694 | 8 |
| 1.644 | 13 |
| 1.641 | 14 |
| 1.625 | 6 |
| 1.568 | 6 |

Formulated $(Hf_{1-x}Zr_x)_3P_2O_{11}$
Scanned at ½./minute at $1 \times 10^3$

Median particle diameter was measured by Coulter Counter, and is expressed in micrometers. X-ray excited optical luminescence (XEOL) intensity and persistence were measured by comparison with a commercial ($CaWO_4$) x-ray luminescent material, designated "PAR."

Results shown in Table II reveal that the samples 1, 2 and 3 exhibited higher intensity values (resulting in faster x-ray speed), but also exhibited higher persistenc than $CaWO_4$. Sample 4 at increased Zr/Hf ratio exhibited both decreased x-ray speed and decreased persistence.

Figure 2:
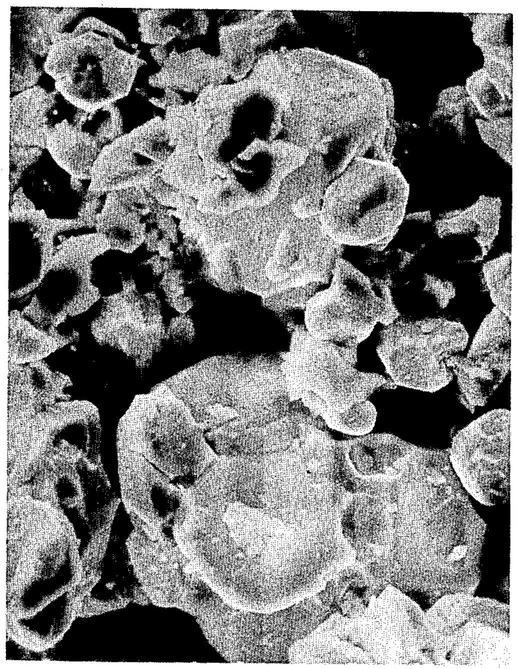
FIG. 2 is a photomicrograph of single crystalline particles of $(Hf_{1-x}Zr_x)_3P_2O_{11}$ prepared from a formulated oxide composition of 70 mole percent $(Hf_{1-x}Zr_x)O_2$, 23 mole percent $P_2O_5$ and 7 mole percent $MgF_2$.

Referring now to FIGS. 1 and 2, photomicrographs at 2000 x magnification of samples 1 and 2, respectively, are shown. The material of FIG. 1 processed by the Example I procedure, formulated from a reaction mixture of 75 mole percent $(Hf_{1-x}Zr_x)O_2$ and 25 mole percent $P_2O_5$, shows a porous aggregate character.

The material of FIG. 2 processed by the Example II procedure, formulated from a reaction mixture of 70 mole percent $(Hf_{1-x}Zr_x)O_2$ and 23 mole percent $P_2O_5$, with 7 mole percent $MgF_2$, shows large single crystalline particles.

While in its broadest aspects the invention essentially is directed to the production of a new compound having utility as a self-activated luminescent material, it is contemplated that activator elements or compounds may be added to the material. However, it should be recognized that such activators, depending upon their characteristics, may significantly influence the emission spectra of the material upon excitation by x-rays or other means. To aid the practitioner, a specific example is set forth of an $Eu^{+2}$ activated material having blue emission.

EXAMPLE III

The procedure of Example I was generally followed for a starting material batch as shown in Table V, except as noted below.

TABLE V

| Material | Mol Ratio | Formula Weight | Gram Ratio | Batch Ratio (0.0164 Mol) (Grams) |
|---|---|---|---|---|
| | | Part (1) | | |
| $HfOCl_2 \cdot 8H_2O$* [Assay 48.6%(Hf,Zr)$O_2$] | 2.84 | 440.34 | 1250.57 | 20.50 |
| $Eu_2O_3$ | 0.08 | 352. | 28.16 | 0.50 |
| $Na_2CO_3$ | 0.08 | 106. | 8.48 | 0.15 |
| $NH_4H_2PO_4$ [Assay 98%] | 2.00 | 117.38 | 234.76 | 3.85 |
| | | Part (2) | | |
| $MgF_2$ [Assay 88.7% $MgF_2$] | 0.35 | 70.26 | 24.59 | 0.40 |

*containing 3.1 weight percent elemental Zr per unit weight of Hf plus Zr in the raw material.

The pre-firing heat treatment was carried out at 370° C, for 1.5 hours, instead of at 260° C for 2 hours, and was repeated, followed by mortaring. Prior to firing, $MgF_2$ in the amount shown in Part (2) of the Table was added to the batch. The firing procedure was altered to achieve a temperature of 1200° C after about 3.5 hours, and held for about 4.5 additional hours at this temperature, after which the crucible was removed and allowed to cool to room temperature.

Upon mortaring, the white body-colored powder emits blue under ultraviolet excitation.

The mortared material was then fired for about 1 hour at about 1100° C in flowing 5% hydrogen-nitrogen mixture and cooled to room temperature still in flowing hydrogen-nitrogen mixture, to place all of the Eu in the divalent state. Blue emission intensity under ultraviolet excitation is thereby increased about 25 percent.

Figure 3:
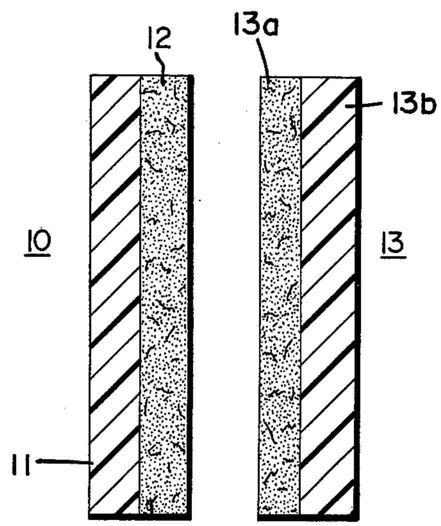
FIG. 3 is a schematic diagram of an x-ray intensifying screen incorporating a luminescent material of the invention, in cooperative relationship with a silver halide emulsion x-ray film.

Referring now to FIG. 3, there is shown one embodiment of an x-ray intensifying screen 10 incorporated a base layer 11 substantially transparent to x-rays, but substantially opaque to visible and ultraviolet radiation. Such base layer could be of a plastic material. A layer of an x-ray excitable luminescent layer 12 is secured to base layer 11, for example, by dispersing the material in an organic binder matrix and coating the matrix on the base layer. Incoming x-rays, upon striking luminescent layer 12, stimulate ultraviolet emissions in all directions. However, the opaqueness of the base layer 11 to such ultraviolet radiation results in at least some redirection of such radiation away from the base layer and toward an x-ray film 13 of base layer 13*b* and emulsion layer 13*a*. Since the film is more sensitive to the ultraviolet radiation than to x-rays, the image produced upon the film by the exposure of the film to such radiation is thereby intensified.

While there has been shown and described what are at present considered the preferred embodiments of the invention, it will be obvious to those skilled in the art that various changes and modifications may be made therein without departing from the scope of the invention as defined by the appended claims.

What is claimed is:

1. A luminescent material having the oxide composition of 3:1 molar proportions of $(Hf_{1-x}Zr_x)O_2$: $P_2O_5$ and the empirical formula $(Hf_{1-x}Zr_x)_3P_2O_{11}$, where $x$ is within the range of 0 to 0.5, said luminescent material exhibiting a peak emission at about 350 nanometers with a band width of about 70 nanometers when excited by x-rays.

2. The process of claim 1 wherein about 30 mole percent of $MgF_2$ is added.

3. The luminescent material of claim 1, consisting essentially of large, single crystalline particles.

4. A process for producing a luminescent material having the oxide composition of 3:1 molar proportions of $(Hf_{1-x}Zr_x)O_2$: $P_2O_5$, and the empirical formula $(Hf_{1-x}Zr_x)_3P_2O_{11}$, where $x$ is within the range of 0 to 0.5, said luminescent material exhibiting a characteristic peak emission at about 350 nanometers with a band width of about 70 nanometers when excited by x-rays, the process comprising:

a. first forming a mixture of compounds selected from the group consisting of $(Hf_{1-x}Zr_x)O_2$, $P_2O_5$ and precursors thereof, which mixture upon an oxide basis corresponds to a molar ratio of $(Hf_{1-x}Zr_x)O_2$:$P_2O_5$ within the range of about 2.85 to 3.15; and b. firing the mixture at a temperature within the range of about 1400° to 2,200° C, for a time sufficient to result in a luminescent material having said characteristic peak.

5. The process of claim 4 wherein x is within the range of about 0 to about 0.25.

6. The process of claim 4 wherein prior to firing, the mixture is:

a. heated at least once to a temperature within the range of from about 260° to 500° C for about 1 to 16 hours, in order to insure removal of at least a portion of contained volatile material, followed by b. comminuting and blending the heated mixture to a relatively uniform powder mixture.

7. An x-ray intensifying screen for use with conventional silver halide emulsion x-ray film to intensify an exposed image on the film, the screen comprising:

a. a base layer of a material substantially transparent to x-rays, but substantially opaque to visible and ultraviolet radiation; and b. a layer of an x-ray excitable luminescent material secured to base layer, characterized in that the luminescent material consists essentially of particles having the oxide composition of 3:1 molar proportions of $(Hf_{1-x}Zr_x)O_2$:$P_2O_5$, and the empirical formula $(Hf_{1-x}Zr_x)_3P_2O_{11}$ where x is within the range of 0 to 0.5, said luminescent material exhibiting a peak emission at about 350 nanometers with a band width of about 70 nanometers when excited by x-rays, whereby good resolution of the image is obtained without substantial crossover.

8. The x-ray intensifying screen of claim 7 wherein $x$ is within the range of about 0 to 0.25.

9. X-ray intensifying screen of claim 7 wherein the $(Hf_{1-x}Zr_x)_3P_2O_{11}$ consists essentially of large single crystalline particles.

10. A process for producing a luminescent material having an oxide composition of 3:1 molar proportions of $(Hf_{1-x}Zr_x)O_2$:$P_2O_5$, and the empirical formula $(Hf_{1-x}Zr_x)_3P_2O_{11}$, where x is within the range of 0 to 0.5, said luminescent material exhibiting a characteristic peak at about 350 nanometers with a band width of about 70 nanometers when excited by x-rays, and the material consisting essentially of large single-crystalline particles, the process comprising:

a. first forming a mixture of compounds selected from the group consisting of $(Hf_{1-x}Zr_x)O_2$, $P_2O_5$ and precursors thereof, which mixture upon an oxide basis corresponds to a molar ratio of $(Hf_{1-x}Zr_x)O_2$:$P_2O_5$ within the range of about 2.85 to 3.15;

b. adding from about 10 to 100 mole percent of magnesium fluoride to the mixture; and c. firing the mixture at a temperature within the range of about 1200° to 1600° C for a time sufficient to result in a luminescent material having said characteristic peak.

11. The process of claim 10 wherein x is within the range of about 0 to 0.25.

12. The process of claim 10 wherein prior to firing, the mixture is:

a. heated at least once to a temperature within the range of from about 260° to 500° C for about 1 to 16 hours, in order to insure removal of at least a portion of contained volatile material, followed by b. comminuting and blending the heated mixture to a relatively uniform powder mixture.

13. The process of claim 10 wherein about 30 mole percent of $MgF_2$ is added to the mixture prior to firing.

* * * * *